United States Patent
Lempiainen

(10) Patent No.: US 10,511,112 B2
(45) Date of Patent: Dec. 17, 2019

(54) MULTI-PORTION CONNECTOR FOR USE WITH DIFFERENTLY-SIZED CARDS

(71) Applicant: Futurewei Technologies, Inc., Plano, TX (US)

(72) Inventor: Risto Juhani Lempiainen, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/863,771

(22) Filed: Jan. 5, 2018

(65) Prior Publication Data

US 2018/0131112 A1    May 10, 2018

Related U.S. Application Data

(63) Continuation of application No. 15/145,757, filed on May 3, 2016, now Pat. No. 9,887,476.

(51) Int. Cl.
*H01R 12/73* (2011.01)
*H01R 13/635* (2006.01)
(Continued)

(52) U.S. Cl.
CPC ....... *H01R 12/73* (2013.01); *G06K 19/07739* (2013.01); *H01R 13/635* (2013.01); *H01R 13/642* (2013.01); *H01R 27/02* (2013.01)

(58) Field of Classification Search
CPC ...... H01R 12/73; H01R 13/02; H01R 13/635; G06K 19/07739
(Continued)

(56) References Cited

U.S. PATENT DOCUMENTS

| 5,877,488 A | 3/1999 | Klatt et al. |
| 6,062,887 A | 5/2000 | Schuster et al. |

(Continued)

FOREIGN PATENT DOCUMENTS

| CN | 2826738 Y | 10/2006 |
| CN | 2865071 Y | 1/2007 |

(Continued)

OTHER PUBLICATIONS

Molex, Part No. 5053302091, Part Description—Nano-SIM and microSD* Combo Connector, Pin-Eject Type, Tray Capable, Apr. 19, 2016, pp. 1-2, retrieved from www.molex.com/webdocs/datasheets/pdf/ko-kr/5053302091_MEMORY_CARD_SOCKET.pdf.

(Continued)

*Primary Examiner* — Tulsidas C Patel
*Assistant Examiner* — Marcus E Harcum
(74) *Attorney, Agent, or Firm* — Fish & Richardson P.C.

(57) ABSTRACT

An apparatus and method are provided for use with a first card of a first size [e.g. subscriber identify module (SIM) card, etc.] and a second card of a second size (e.g. memory card, etc.). Included is a connector with a first portion and a second portion which is configured for being manipulated to have a first orientation and a second orientation. The first orientation is such that the first portion of the connector is positioned for removably receiving the first card, or the second portion of the connector is positioned for removably receiving the second card. Further, the second orientation is such that the first card is stacked with the second card for being removably inserted in a device. This permits electrical communication between the device and the first card when the first card is removably received in the first portion of the connector, and further permits electrical communication between the device and the second card when the second (Continued)

card is removably received in the second portion of the connector.

20 Claims, 7 Drawing Sheets

(51) Int. Cl.
*H01R 13/642* (2006.01)
*H01R 27/02* (2006.01)
*G06K 19/077* (2006.01)

(58) Field of Classification Search
USPC .................................................. 439/631, 159
See application file for complete search history.

(56) References Cited

U.S. PATENT DOCUMENTS

| | | | |
|---|---|---|---|
| 6,468,101 B2* | 10/2002 | Suzuki | H01R 12/714 |
| | | | 439/326 |
| 6,471,550 B2 | 10/2002 | Maiterth et al. | |
| 6,568,960 B2 | 5/2003 | Bricaud et al. | |
| 6,896,548 B2 | 5/2005 | Scuteri et al. | |
| 7,699,661 B2 | 4/2010 | Wu | |
| 7,789,691 B2 | 9/2010 | Li et al. | |
| 7,887,357 B1 | 2/2011 | Yang | |
| 7,946,876 B1 | 5/2011 | Huang | |
| 7,976,327 B2 | 7/2011 | Matsumoto et al. | |
| 8,113,886 B2* | 2/2012 | Jung | H01R 27/02 |
| | | | 439/630 |
| 8,308,514 B1* | 11/2012 | Su | H01R 27/02 |
| | | | 439/630 |
| 8,376,764 B1 | 2/2013 | Su et al. | |
| 8,827,727 B2 | 9/2014 | Yang et al. | |
| 8,961,207 B2* | 2/2015 | Lim | H01R 13/6335 |
| | | | 439/159 |
| 9,887,476 B2 | 2/2018 | Lempiainen | |
| 2011/0092087 A1 | 4/2011 | Jung et al. | |
| 2011/0122030 A1 | 5/2011 | Suzuki et al. | |
| 2012/0058661 A1 | 3/2012 | Wu et al. | |
| 2012/0276780 A1 | 11/2012 | Hu et al. | |
| 2013/0288535 A1 | 10/2013 | You et al. | |
| 2014/0099805 A1 | 4/2014 | Kutchery et al. | |
| 2014/0113495 A1 | 4/2014 | Lim et al. | |
| 2016/0006158 A1 | 1/2016 | Lu et al. | |
| 2017/0324177 A1 | 11/2017 | Lempiainen | |

FOREIGN PATENT DOCUMENTS

| | | |
|---|---|---|
| CN | 201072869 Y | 6/2008 |
| CN | 201289917 Y | 8/2009 |
| CN | 202067932 U | 12/2011 |
| CN | 202268549 U | 6/2012 |
| CN | 103311721 A | 9/2013 |
| CN | 203747075 U | 7/2014 |
| CN | 205141320 U | 4/2016 |
| DE | 29607253 U1 | 7/1996 |
| EP | 1199776 A1 | 4/2002 |
| RU | 2578791 C1 | 3/2016 |

OTHER PUBLICATIONS

Molex, Part No. 1042391430, Part Description—microSD*/Nano-SIM Combo Connector, 2.05mm Height, Pull-Lever Eject, Normal Mount, With Detect Switch, 8-Circuit microSD* Card Type, 6-Circuit Nano-SIM Card Type, Apr. 8, 2016, p. 1, retrieved from www.molex.com/webdocs/datasheets/pdf/ko-kr/1042391430_MEMORY_CARD_SOCKET.pdf.
Memory Card Connectors—Molex, May 2016, pp. 1-5, www.molex.com/molex/products/group?key=memory_card_connectors&channel=PRODUCTS.
International Search Report and Written Opinion for PCT Application No. PCT/CN2017/082546, dated Aug. 1, 2017.
Non-Final Office Action from U.S. Appl. No. 15/145,757, dated Nov. 1, 2016.
Final Office Action from U.S. Appl. No. 15/145,757, dated May 30, 2017.
Notice of Allowance from U.S. Appl. No. 15/145,757, dated Sep. 27, 2017.
Supplemental Notice of Allowance from U.S. Appl. No. 15/145,757, dated Nov. 17, 2017.
Extended European Search Report issued in European Application No. 17792462.8 dated Mar. 25, 2019, 8 pages.
Office Action issued in Russian Application No. 2018142032107 dated May 23, 2019, 16 pages (with English translation).
Office Action issued in Chinese Application No. 201780025434.9 on Sep. 2, 2019, 24 pages (with English translation).

* cited by examiner

MULTI-PORTION CONNECTOR FOR USE WITH DIFFERENTLY-SIZED CARDS

RELATED APPLICATION(S)

This application is a continuation of U.S. application Ser. No. 15/145,757, filed May 3, 2016, the entire contents of which are incorporated herein by reference.

FIELD OF THE INVENTION

The present invention relates to electronic devices and more particularly to electronic devices with connectors for accepting cards of different sizes.

BACKGROUND

Electronic devices, such as cellular phones, tablets, etc., have recently been equipped with the ability to accept multiple types of cards of different sizes. For example, subscriber identify modules (i.e. SIM cards, etc.) are often inserted in an electronic device for identifying and/or authenticating subscribers, store a limited amount of data, such as a subscriber's identity, security, and/or personal information for use in connection with a network. Further, memory cards are sometimes inserted in the electronic device to provide augmented storage space for use during electronic device operation. One example of such memory cards includes Secure Device (SD) cards. SD cards are typically available in different form factors (e.g. standard SD, miniSD, and microSD, etc.).

Traditional connectors have been designed to simultaneously accommodate such multiple card types of different sizes. For instance, such connectors have vertically-stacked such multiple card types, as well as maintain them horizontally-positioned within a common plane, for insertion into an electronic device. Typically, such horizontal positioning has required an undesirable larger amount of printed wiring board (PWB) space, while vertically-stacked designs lack other desirable features.

SUMMARY

An apparatus and method are provided for use with a first card of a first size [e.g. subscriber identify module (SIM) card, etc.] and a second card of a second size (e.g. memory card, etc.). Included is a connector with a first portion and a second portion which is configured for being manipulated to have a first orientation and a second orientation. The first orientation is such that the first portion of the connector is positioned for removably receiving the first card, or the second portion of the connector is positioned for removably receiving the second card. Further, the second orientation is such that the first card is stacked with the second card for being removably inserted in a device. This permits electrical communication between the device and the first card when the first card is removably received in the first portion of the connector, and further permits electrical communication between the device and the second card when the second card is removably received in the second portion of the connector.

In a first embodiment, the first portion of the connector may be positioned for removably receiving the first card in the first orientation. Further, the second portion of the connector may be positioned for removably receiving the second card in the second orientation.

In a second embodiment (which may or may not be combined with the first embodiment), the first portion of the connector may be movably coupled to the second portion of the connector such that the first portion of the connector and the second portion of the connector are movable between the first orientation and the second orientation. For example, the first portion of the connector may be movably coupled to the second portion of the connector via at least one hinge.

In a third embodiment (which may or may not be combined with the first and/or second embodiments), the connector may include at least one lock for maintaining the first portion of the connector and the second portion of the connector in the second orientation. As an option, the at least one lock may maintain the first portion and the second portion of the connector in the second orientation utilizing friction.

In a fourth embodiment (which may or may not be combined with the first, second, and/or third embodiments), when in the second orientation and when the first card is removably received in the first portion of the connector, the connector may be configured such that the first card is locked in the first portion of the connector. Still yet, when in the second orientation and when the first card is removably received in the first portion of the connector, the connector may be configured such that the first card is locked in the first portion of the connector, regardless as to whether the second card is removably received in the second portion of the connector.

In a fifth embodiment (which may or may not be combined with the first, second, third, and/or fourth embodiments), the connector may be configured for being removed from the device without powering down the device.

In a sixth embodiment (which may or may not be combined with the first, second, third, fourth, and/or fifth embodiments), the first portion of the connector may be shaped to preclude removably receiving the first card in an improper orientation. Further, the second portion of the connector may be shaped to preclude removably receiving the second card in an improper orientation.

In a seventh embodiment (which may or may not be combined with the first, second, third, fourth, fifth, and/or sixth embodiments), an aperture may be formed therein for receiving a pin to remove the connector from the device. Further, the connector may include an aperture formed therein for receiving a pin to remove the connector from the device.

In an eighth embodiment (which may or may not be combined with the first, second, third, fourth, fifth, sixth, and/or seventh embodiments), the first portion may be configured for removably receiving the first card in a form of the SIM card, and the second portion may be configured for removably receiving the second card in a form of the memory card [e.g. secure device (SD) card, etc.].

In a ninth embodiment (which may or may not be combined with the first, second, third, fourth, fifth, sixth, seventh, and/or eighth embodiments), a connector housing may be provided that is configured for removably receiving the connector. As an option, the connector housing may include a switch for detecting whether the first card is in the first portion of the connector when the connector is removably inserted in the connector housing. Further, the connector housing may include a lever positioned between first card contacts and second card contacts for ejecting the connector from the connector housing.

In a tenth embodiment (which may or may not be combined with the first, second, third, fourth, fifth, sixth, seventh, eighth, and/or ninth embodiments), a system may be provided in the form of the device that incorporates the connector housing that is, in turn, configured for removably receiving the connector.

To this end, in some optional embodiments, the aforementioned apparatus, method, and/or system may provide various advancements. For example, by providing the connector with the two portions that have the two possible orientations; the connector is configured, in the first orientation, to facilitate insertion of at least one of the cards into the connector. Further, the connector is configured, in the second orientation, to maintain the cards vertically stacked, thereby minimizing an amount of printed wiring board (PWB) space that is required when the connector and the cards are inserted into the device. It should be noted that the aforementioned potential advantages are set forth for illustrative purposes only and should not be construed as limiting in any manner.

DETAILED DESCRIPTION

Figure 1A:
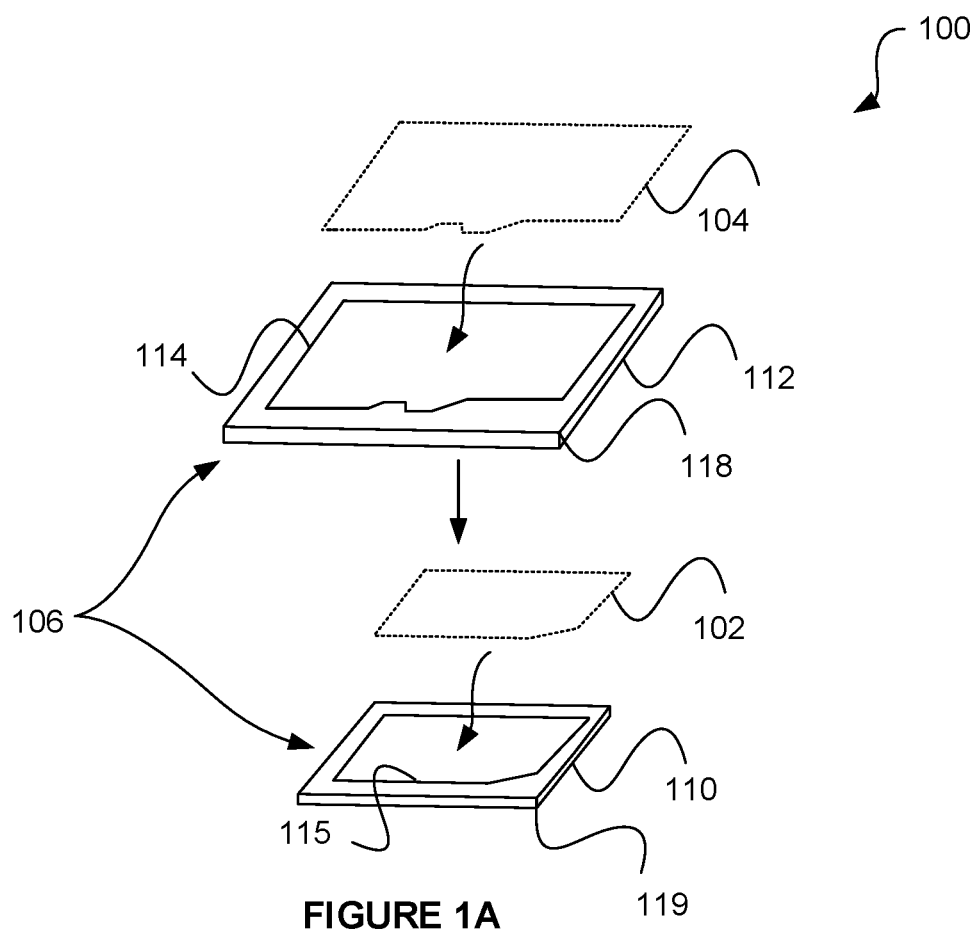
FIG. 1A is a perspective view of a connector for stacking a first card in the form of a subscriber identity module (i.e. SIM card) and a second card in the form of a memory card in a first orientation, in accordance with one embodiment.
Figure 1B:
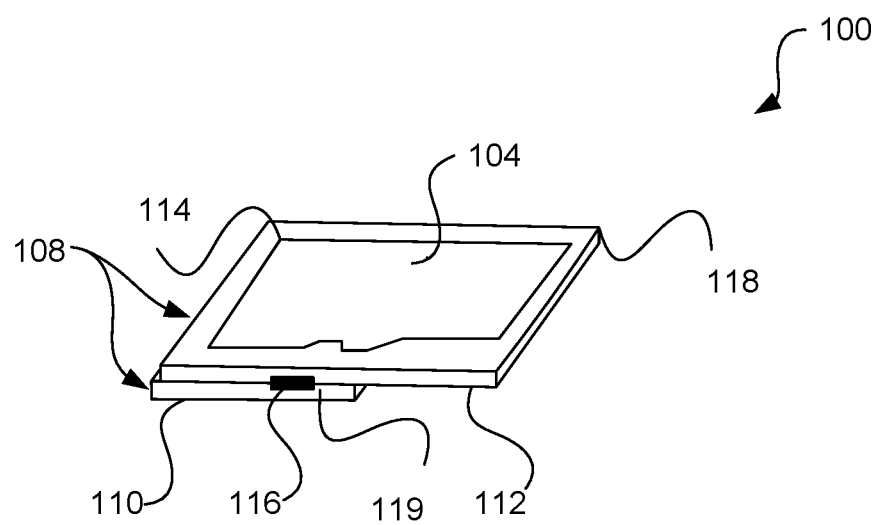
FIG. 1B is a perspective view of the connector of FIG. 1A in a second orientation for stacking the SIM (not shown) and the memory card.

FIG. 1A is a perspective view of a connector 100 for stacking a first card in the form of a subscriber identity module (i.e. SIM card 102) and a second card in the form of a memory card 104 in a first orientation 106, in accordance with one embodiment. FIG. 1B is a perspective view of the connector 100 of FIG. 1A in a second orientation 108 for stacking the SIM (not shown) and the memory card 104. As collectively shown in FIGS. 1A-1B, the connector 100 includes a first portion 110 and a second portion 112. It should be noted that the SIM card 102 and the memory card 104 are shown in FIGS. 1A-1B for illustrative purposes only and should not be construed as limiting in any manner. For example, other embodiments are contemplated where any two cards may be employed in lieu of the SIM card 102 and/or the memory card 104 insofar as the cards are different in size (i.e. one card is of a first size and another card is of a second size, etc.).

In the context of the present description, the first portion 110 and the second portion 112 may refer to any two parts or components of the connector 100 that are capable of removably receiving an associated card. To accomplish this, in one embodiment, the first portion 110 and the second portion 112 may include two trays, for example. In other embodiments, the first portion 110 and/or the second portion 112 may take the form of other structures including, but not limited to a container, cartridge, chamber, holder, and/or any other structure capable of removably receiving the associated card. Further, the first portion 110 and the second portion 112 may be constructed from any suitable material (e.g. plastic, metal, etc.).

As further shown, the first portion 110 is configured for removably receiving the SIM card 102. In the context of the present description, the SIM card 102 may refer to any card that is operable for storing at least user identification information for use with an associated device (not shown) on a network (e.g. 4G, LTE, WiMax, and/or any other type of network, etc.). In other optional embodiments, the SIM card 102 may also possibly include security and/or other personal information, as well. Further, the aforementioned device (not shown) may include a phone, personal data assistant, tablet, laptop, vehicle, and/or any other device that is capable of being used on the aforementioned network.

As further shown, the second portion 112 is configured for removably receiving the memory card 104. In one embodiment, such memory card 104 may include a micro Secure Device (SD) card, while in other embodiments the memory card 104 may have a different form factor (e.g. standard SD, miniSD, nanoSD, etc.). For that matter, the memory card 104 may even include any other type of card (e.g. non-SD, etc.) that is equipped with memory for any desired storage purposes.

In use, the connector 100 is configured for being manipulated to have multiple orientations, at least one of which that further facilitates the removable receipt of at least one of the cards (or both), and another one of which that facilitates removable insertion of the connector 100 into the device. The aforementioned manipulation may involve any physical contact of a user. Further, such physical contact may or may not involve direct tool-less physical contact; a tool; and/or mechanical, automated, and/or semi-automated mechanisms that facilitate the aforementioned manipulation.

With reference to FIG. 1A, the connector 100 is capable of being manipulated to have the first orientation 106. In one optional embodiment, such first orientation 106 may be effected by physically separating at least a portion (or an entirety) of the first portion 110 and the second portion 112. In such first orientation 106, the first portion 110 of the connector 100 may be positioned for removably receiving the SIM card 102, and/or the second portion 112 of the connector 100 may be positioned for removably receiving the memory card 104.

For example, in one possible embodiment (that will be described later in greater detail), the first portion 110 may be equipped with a radially-inward extending lip integrally formed along a lower, inner periphery 114 thereof, for supporting the SIM card 102 generally within a same plane in which the first portion 110 resides. While the second portion 112 of the connector 100 may be equipped with a similarly-constructed lip formed along a lower, inner periphery 115 thereof for supporting the memory card 104, it should be noted that such feature is strictly optional. For that matter, in one embodiment, both portions 110, 112 may be void of a supporting feature such as the aforementioned lip.

Depending on 1) which card (e.g. SIM card 102, memory card 104, etc.) is positioned on top of the other and/or 2) which portion 110,112 is equipped with a supporting feature (e.g. the aforementioned lip, etc.), the first orientation 106 of the connector 100 may be configured for removably receiving: only the SIM card 102, only the memory card 104, or both the SIM card 102 and the memory card 104. Any of the foregoing possibilities are contemplated in the context of the present disclosure.

With reference to FIG. 1B, the connector 100 is further capable of being manipulated to have the second orientation 108 where the SIM card 102 is stacked with the memory card 104. In the context of the present description, the stacking of the cards 102, 104 may refer to any relative positioning of the cards 102, 104 where one is positioned at least partially on top of the other. In one embodiment, the cards 102, 104 may be geometrically aligned in a symmetric vertical stack, while other embodiments are contemplated where some misalignment may be incorporated to facilitate electrical access thereto. Further, various embodiments are envisioned where the cards 102, 104 are directly in contact with each other or there is some sort of insulation (e.g. air, other cards, insulative material, etc.) positioned therebetween.

To the extent that one of the portions 110, 112 of the connector 100 is not equipped to removable receive at least one of the cards 102, 104 in the first orientation 106 (or is able to removable receive at least one of the cards 102, 104 in either orientation 106, 108), at least one of the portions 110, 112 of the connector 100 may be capable of receiving at least one of the cards 102, 104 in the second orientation 108. For example, in one embodiment where the second portion 112 of the connector 100 does not have a lip or the like to support the memory card 104, the second portion 112 of the connector 100 may be configured to removably receive the memory card 104 while in the second orientation 108. In such embodiment, the memory card 104 may be supported by the underlying first portion 110 and/or the SIM card 102 in the second orientation 108.

While in the second orientation 108, the portions 110, 112 of the connector 100 are configured for being removably inserted in the device to permit electrical communication between the device and the cards 102, 104 when the cards 102, 104 are removably received in the associated portions 110, 112 of the connector 100. To facilitate such electrical communication with the device, one or both of the portions 110, 112 of the connector 100 may, in various embodiments, be shaped to preclude removable receipt of the cards 102, 104 in an improper orientation (e.g. where the contacts thereof are not positioned correctly, etc.).

Returning to FIG. 1A, the first portion 110 and the second portion 112 of the connector 100 are shown to be completely detachable and thus are completely and freely movable with respect to each other in the second orientation 108. It should not be noted, however, that, in other embodiments, at least part of the portions 110, 112 of the connector 100 may remain coupled in any desired manner, such that the movement of the portions 110, 112 are at least partially restricted and/or guided when moved between the first orientation 106 the second orientation 108. For example, in one embodiment that will be described hereinafter in greater detail, the first portion 110 of the connector 100 may be movably coupled to the second portion 112 of the connector 100 via at least one hinge (not shown).

As will also be described later in the context of subsequent embodiments, the connector may incorporate at least one lock 116 for maintaining the first portion 110 and the second portion 112 of the connector 100 in the second orientation 108. In different embodiments, the at least one lock 116 may accomplish this utilizing friction, a protrusion/detent combination, a pin/aperture combination, and/or any other suitable locking mechanism capable of maintaining the connector 100 in the second orientation 108. Further, when in the second orientation 108 (and when the SIM card 102 is in the first portion 110 of the connector 100), the connector 100 may be configured such that the SIM card 102 remains locked in position. In one embodiment, this may be the case regardless as to whether the memory card 104 is removably received in the second portion 112 of the connector 100.

In still other embodiments, the connector 100 may include more than the two portions 110, 112 to accommodate more than the two cards 102, 104. For example, embodiments are contemplated that include any N number of portions (where N=3, 4 . . . any integer) which accommodate any N number of cards. Of course, such additional cards may or may not be the same type/size as the two cards 102, 104.

By providing the connector 100 with at least the two portions 110, 112 that have the two possible orientations 106, 108; the connector 100 is configured, in the first orientation 106, to facilitate insertion of at least one of the cards 102, 104 into the connector 100. Further, the connector 100 is configured, in the second orientation 108, to maintain the cards 102, 104 vertically stacked, thereby minimizing an amount of printed wiring board (PWB) space that is required when the connector 100 and the cards 102, 104 are inserted into a device.

As mentioned earlier, some embodiments may include various structures (e.g. a hinge, a lock, etc.) for guiding the two portions 110, 112 between the two orientation 106, 108 and maintaining them in the second orientation 108 when the connector 100 and the cards 102, 104 are inserted into the device. With that said, other embodiments are also contemplated devoid of such structures, whereby the two portions 110, 112 themselves at least partially encompass the cards 102, 104, in the second orientation 108, for the purpose of facilitating insertion of the stacked cards 102, 104 into the device in a manner that ensures electrical connectivity between the device and the cards 102, 104 during use.

Examples of structural features that facilitate the foregoing include the inner periphery 114 of the first portion 110 of the connector 100, and the inner periphery 115 of the second portion 112 of the connector 100 which may be specifically sized and shaped in the manner shown to accommodate the specific size and shape of the respective cards 102, 104. By this design, the cards 102, 104 may be more easily received and are maintained in a proper position when the connector 100 is removably inserted in a device. Still yet, an outer periphery 118 of the first portion 110 of the connector 100 and an outer periphery 119 of the second portion 112 of the connector 100 may be at least partially sized and shaped to have the same or similar dimensions. To this end, when in the second orientation 108, the outer peripheries 118, 119 of the portions 110, 112 of the connector 100 may be at least partially congruent to facilitate the insertion of the connector 100 into a slot of a connector housing (to be described later) that has uniform dimensions (e.g. rectangular, etc.).

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the exclusion of other features described.

Figure 2A:
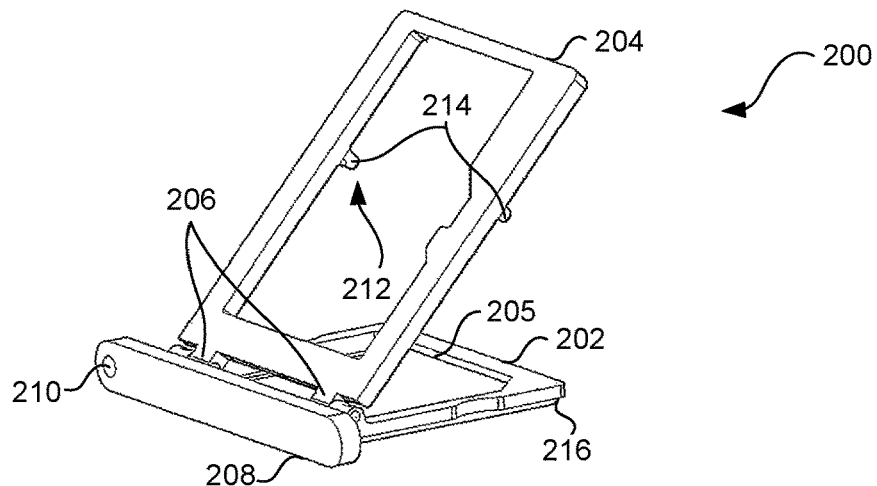
FIG. 2A is a top perspective view of a connector in an open orientation, in accordance with another embodiment.

FIG. 2A is a top perspective view of a connector 200 in an open orientation, in accordance with another embodiment. As an option, the connector 200 may be constructed with or without one or more of the features of any one or more of the embodiments set forth in any previous and/or subsequent figure(s) and/or the description thereof. However, it is to be appreciated that the connector 200 may be constructed in any desired manner.

As shown, the connector 200 includes a first tray 202 that is shaped for removably receiving a SIM card (not shown) and a second tray 204 that is shaped for removably receiving a memory card (not shown). To secure the SIM card in place, the first tray 202 includes a radially-inward extending lip 205 integrally formed along a lower, inner periphery thereof.

The first tray 202 is further hingably coupled to the second tray 204 via a pair of hinges 206. Also included is a handle member 208 for being handled by a user during manipulation of the trays 202, 204 and/or inserting the connector 200 into a device (not shown). The handle member 208 of the connector 200 further includes an aperture 210 formed therein for receiving a pin (not shown) to remove the connector 200 from the device, in a manner that will be described later.

With continuing reference to FIG. 2A, the connector 200 is equipped with a lock assembly 212 including a pair of rigid protrusions 214 formed approximately midway along lower edges of the second tray 204 for releasably and frictionally engaging a pair of detents 216 formed in opposite sides of an end of the first tray 202. To this end, the first tray 202 and the second tray 204 are operable for being moved between an open orientation (shown in FIG. 2A) and a closed orientation. In the open orientation, the first tray 202 is exposed for removably receiving the SIM card and supporting the same by way of the lip 205.

As mentioned earlier, various embodiments are contemplated that do not include the hinges 206. In such other embodiments, such lock assembly 212 may, for example, include additional (e.g. four, etc.) protrusion 214/detent 216 combinations (or other locking mechanisms) positioned to secure the trays 202, 204 together when the connector 200 is in a closed orientation, but allow more mobility of the trays 202, 204 when in an open orientation.

Figure 2B:
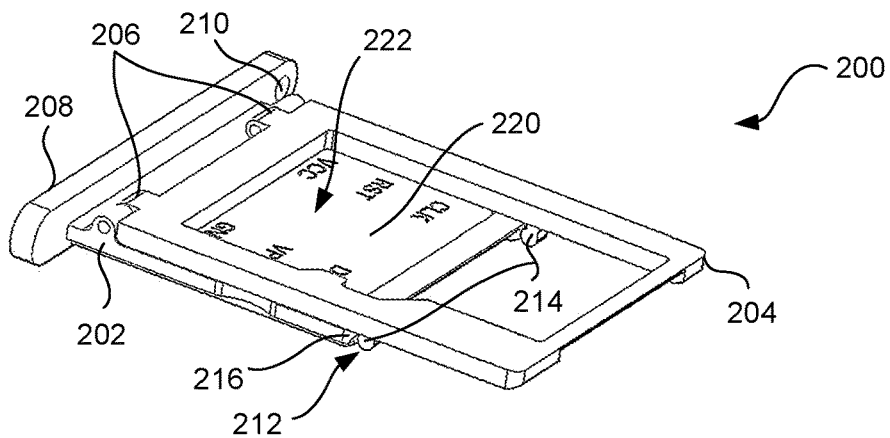
FIG. 2B is another top perspective view of the connector of the embodiment of FIG. 2A in a closed orientation with a SIM card secured in place.
Figure 2C:
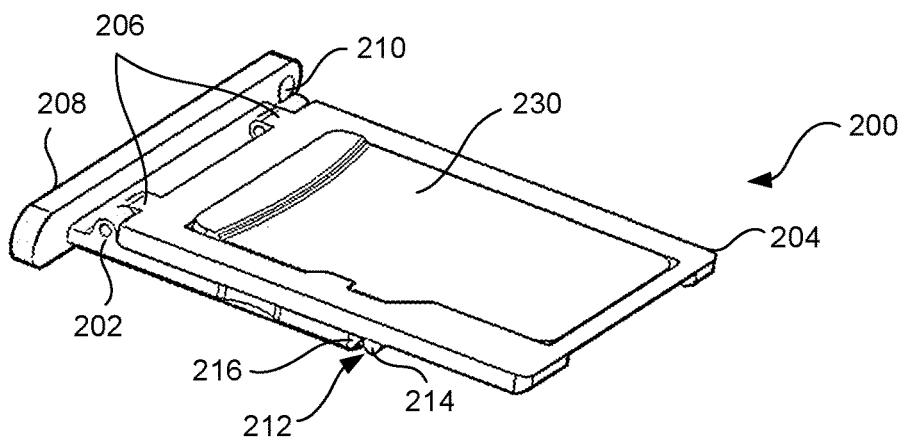
FIG. 2C is yet another top perspective view of the connector of the embodiment of FIGS. 2A-2B in the closed orientation with a memory card inserted therein.

FIG. 2B is another top perspective view of the connector 200 of the embodiment of FIG. 2A in a closed orientation with a SIM card 220 secured in place. As shown, in the closed orientation, the protrusions 214 of the lock assembly 212 are frictionally engaged with the detents 216 of the first tray 202. To this end, the SIM card 220 is secured in place by the second tray 204. Further, when the connector 200 is in the closed orientation, a cavity 222 is formed by a top of the SIM card 220 and an inner periphery of the second tray 204, for receiving the memory card. FIG. 2C is yet another top perspective view of the connector 200 of the embodiment of FIGS. 2A-2B in the closed orientation with a memory card 230 inserted therein.

Figure 2D:
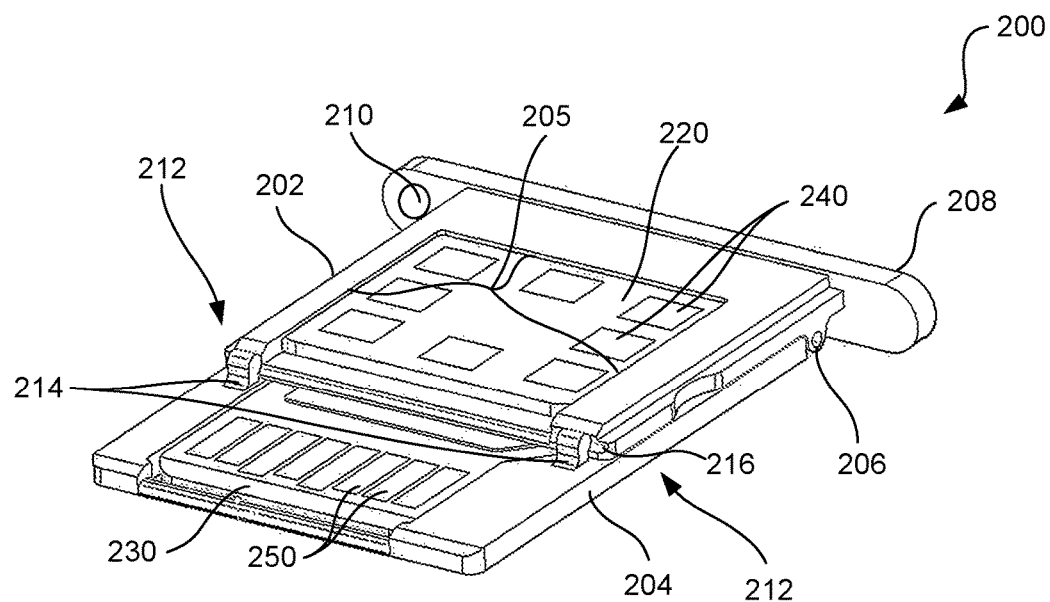
FIG. 2D is a bottom perspective view of the connector of the embodiment of FIGS. 2A-2C in the closed orientation with both the SIM card and the memory card in place.

FIG. 2D is a bottom perspective view of the connector 200 of the embodiment of FIGS. 2A-2C in the closed orientation with both the SIM card 220 and the memory card 230 in place. As shown, contacts 240 of the SIM card 220 and contacts 250 of the memory card 230 are exposed by the connector 200 while in the closed orientation. To this end, the connector is ready for removable insertion into a connector housing (not shown) embodied in a device (not shown), for permitting electrical communication between the device, and the SIM card 220 and the memory card 230.

Figure 3A:
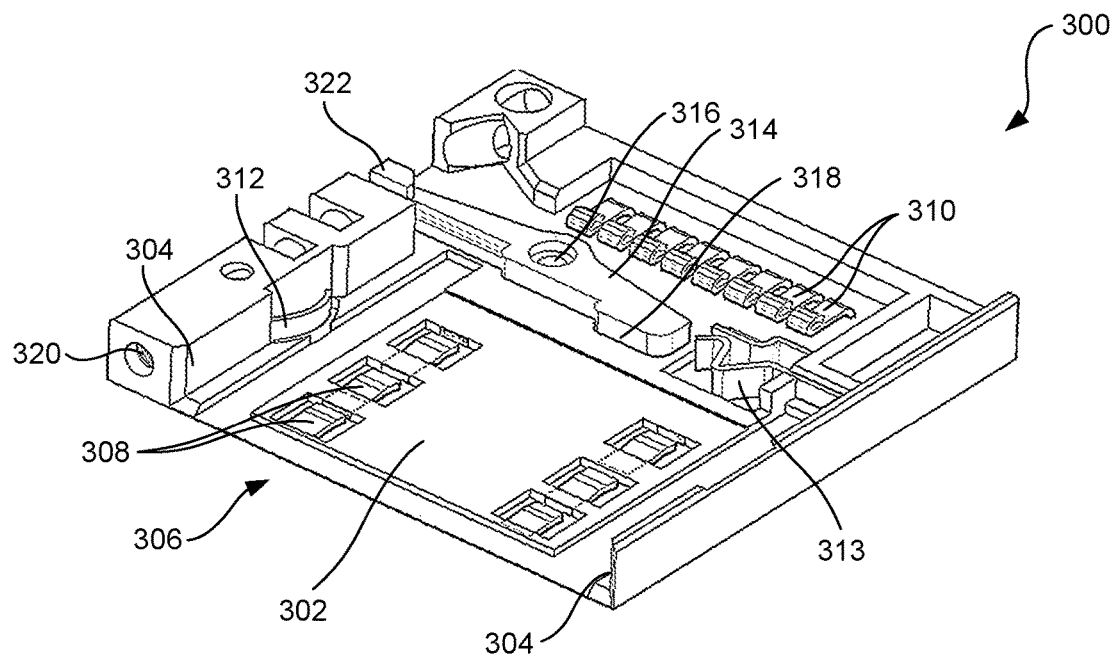
FIG. 3A is a top perspective view of an empty connector housing, in accordance with another embodiment.

FIG. 3A is a top perspective view of an empty connector housing 300, in accordance with another embodiment. As an option, the connector housing 300 may be constructed for use with one or more of the connectors (with or without any of the features thereof) of any one or more of the embodiments set forth in any previous and/or subsequent figure(s) and/or the description thereof. However, it is to be appreciated that the connector housing 300 may be constructed for any desired connector.

As shown, the connector housing 300 includes a bottom face 302 and a pair of side walls 304 for defining an opening 306 adapted to receive a connector (not shown). The connector housing 300 is further equipped with SIM card contacts 308 and memory card contacts 310 for engaging the SIM and memory card (both not shown), respectively, when the connector is received. To maintain the connector in place when inserted, at least one tray retention spring 312 is formed on the inner face of one or both of the side walls 304. In use, such retention spring(s) 312 may be biased upon insertion of the connector to maintain the connector inserted until released.

In order to detect whether the connector (and, more particularly, the SIM card) is inserted in the connector housing 300, the connector housing 300 includes a detect switch 313. In operation, the detect switch 313 has an unbiased open orientation when the detect switch 313 is not abutted by the connector/SIM card. Further, the detect switch 313 has a biased closed orientation when the detect switch 313 is indeed abutted by the connector/SIM card when inserted. By this design, a device (not shown) may detect the absence of the connector (and/or absence of associated cards) when the device is powered up, thereby triggering an appropriate mode of operation that allows for continued use of the device absent a SIM. This, in turn, enables the connector to be removed from the device without necessarily powering down the device.

Further, it should be noted that the detect switch 313 may not necessarily be dedicated only for a SIM card "hot swap," as described above, but also serve as a switch for protecting the memory card prior to removing the connector from the connector housing 300. When the removal of the connector is started, the detect switch 313 may be configured to provide a signal that disables any ability to write/read on the memory card. Such function may thus prevent the memory card from becoming corrupted.

To eject the connector, the connector housing 300 is equipped with a lever 314 that is pivotably coupled via a pivot point 316. The lever 314 operates so as to engage a connector tray (that holds the SIM) with a first end 318 of the lever 314, in response to insertion of a pin (not shown) in a hole 320 formed in the connector housing 300 such that the pin engages a second end 322 of the lever 314.

Figure 3B:
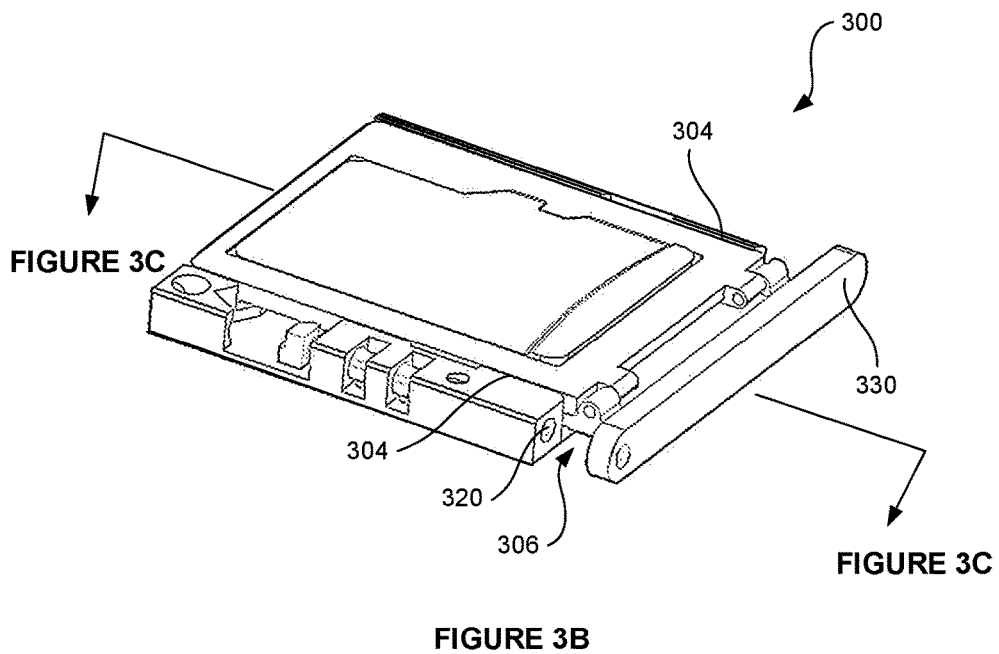
FIG. 3B is another top perspective view of the connector housing of FIG. 3A with a connector inserted therein.
Figure 3C:
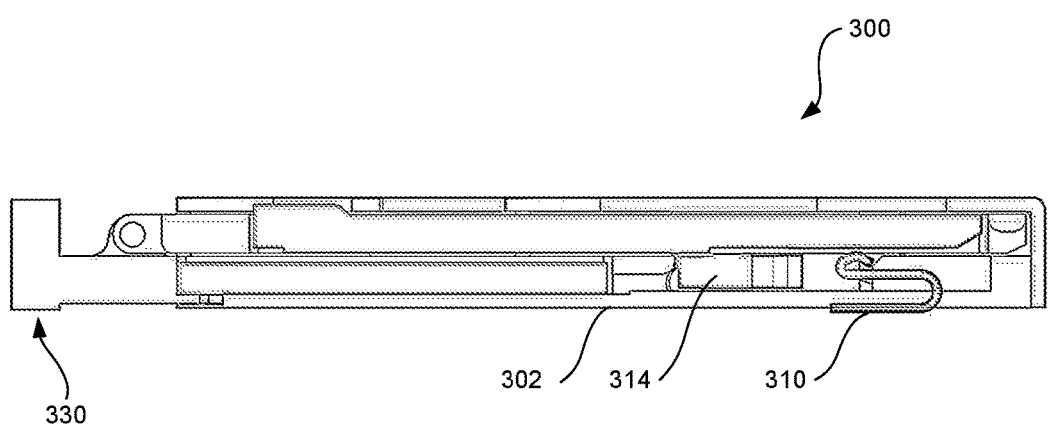
FIG. 3C is a cross-sectional view of the connector housing and connector of FIG. 3B taken along line 3C-3C.

FIG. 3B is another top perspective view of the connector housing 300 of FIG. 3A with a connector 330 inserted therein. Further, FIG. 3C is a cross-sectional view of the connector housing 300 and connector 330 of FIG. 3B taken along line 3C-3C. In one embodiment, the lever 314 may be positioned between the SIM card contacts 308 and the memory card contacts 310, in the position shown particularly in FIG. 3C, to preserve available space (particularly at the inner end of the connector housing 300) for other componentry.

Figure 4:
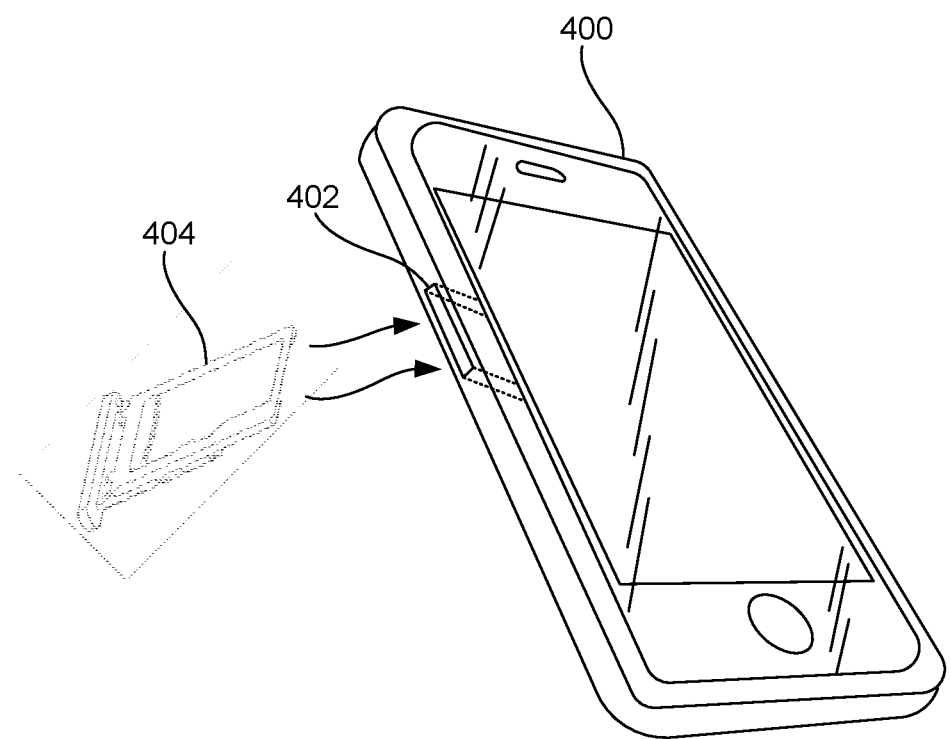
FIG. 4 is a perspective view a device that is equipped with a connector housing for removably receiving a connector.

FIG. 4 is a perspective view a device 400 that is equipped with a connector housing 402 for removably receiving a connector 404. While the device of FIG. 4 is shown to include a phone, it should be noted that the connector housing 402 may be incorporated into any desired device. Other examples of such devices and possible environments will now be set forth.

Figure 5:
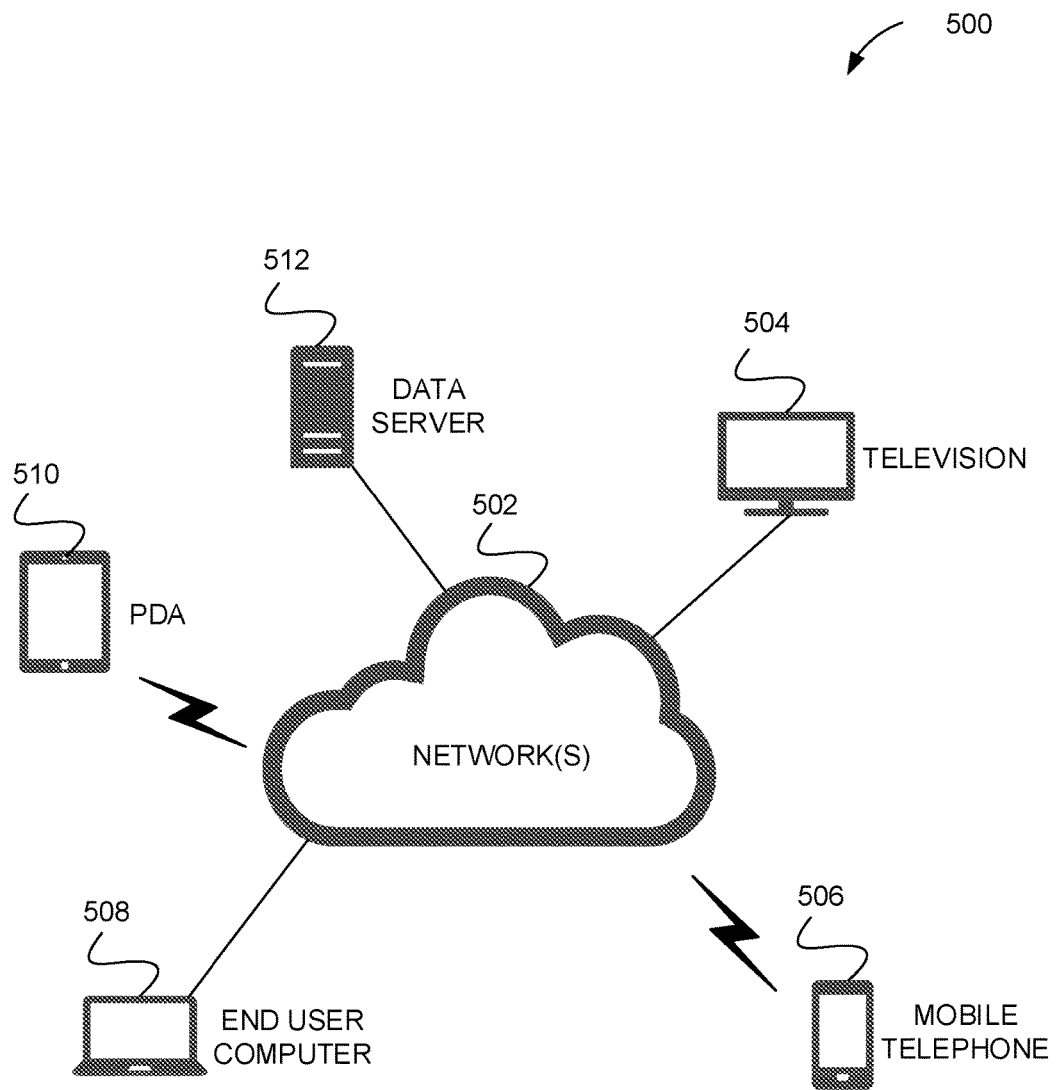
FIG. 5 illustrates a network architecture, in accordance with one embodiment.

FIG. 5 illustrates a network architecture 500, in accordance with one embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 512 and an end user computer 508 may be coupled to the network 502 for communication purposes. Such end user computer 508 may include a desktop computer, lap-top computer, and/or any other type of logic. Still yet, various other devices may be coupled to the network 502 including a personal digital assistant (PDA) device 510, a mobile phone device 506, a television 504, etc.

Figure 6:
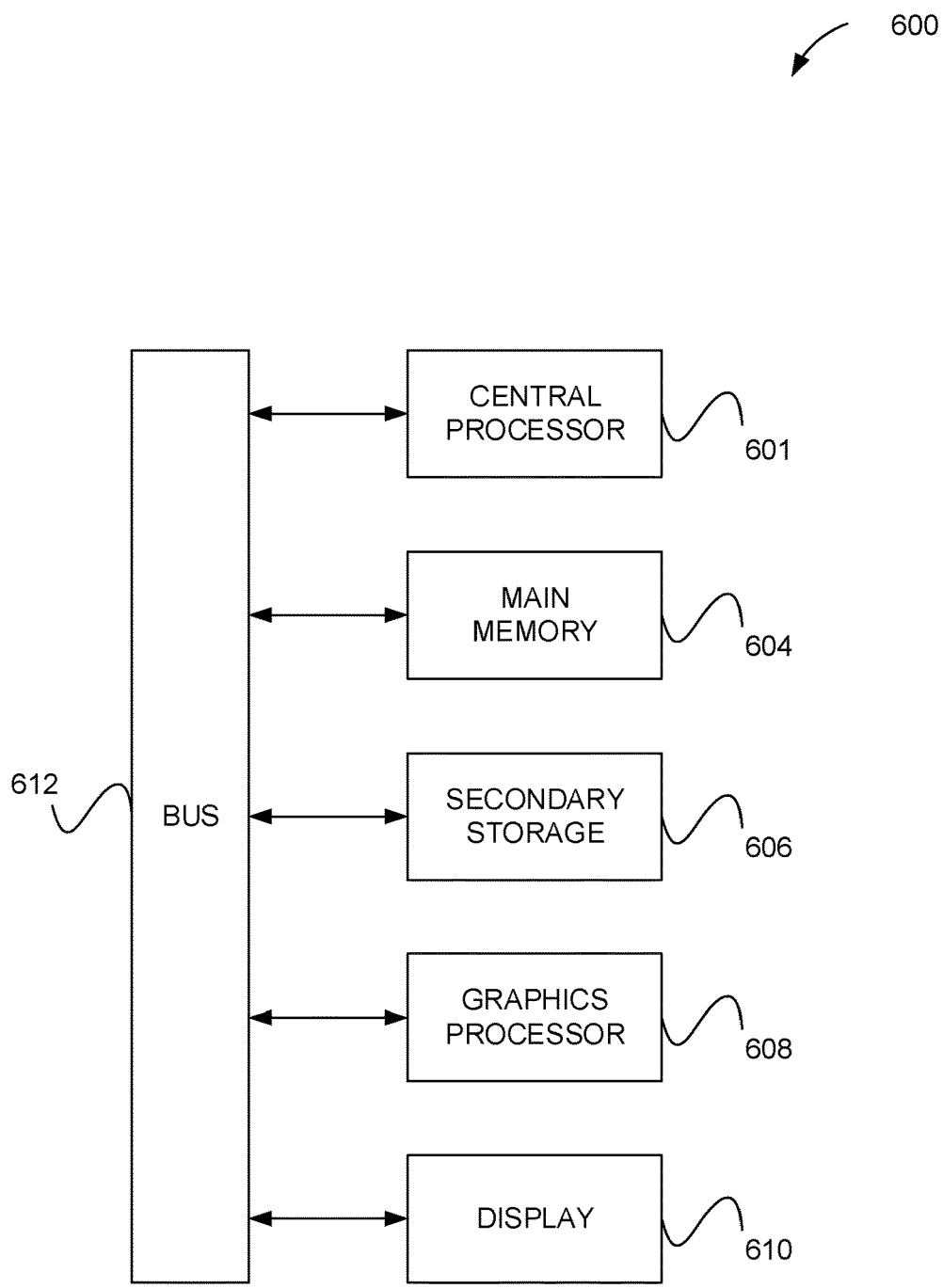
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. However, it is to be appreciated that the system 600 may be implemented in any desired environment.

As shown, a system 600 is provided including at least one central processor 601 which is connected to a bus 612. The system 600 also includes main memory 604 [e.g., hard disk drive, solid state drive, random access memory (RAM), etc.]. The system 600 also includes a graphics processor 608 and a display 610.

The system 600 may also include a secondary storage 606. The secondary storage 606 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 606, and/or any other memory, for that matter. Such computer programs, when executed, enable the system 600 to perform various functions (as set forth above, for example). Memory 604, secondary storage 606 and/or any other storage are possible examples of non-transitory computer-readable media.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An apparatus, comprising:
  a connector including a first portion and a second portion, the connector being configured to receive both a first card of a first size and a second card of a second size, wherein the first portion is moveable with respect to the second portion so as to configure the connector in a first orientation or a second orientation, the connector being configurable such that:
    in the first orientation, the first portion of the connector is positioned for removably receiving the first card of the first size, or the second portion of the connector is positioned for removably receiving the second card of the second size; and
    in the second orientation, the first card is stacked with the second card for being removably inserted in a device to permit electrical communication between the device and the first card when the first card is removably received in the first portion of the connector, and
  wherein the connector is configured for being removed from the device without powering down the device.

2. The apparatus of claim 1, wherein, in the first orientation, the first portion of the connector is positioned for removably receiving the first card.

3. The apparatus of claim 2, wherein, in the second orientation, the second portion of the connector is positioned for removably receiving the second card.

4. The apparatus of claim 1, wherein the first portion of the connector is movably coupled to the second portion of the connector such that the first portion of the connector and the second portion of the connector are movable between the first orientation and the second orientation.

5. The apparatus of claim 4, wherein the first portion of the connector is movably coupled to the second portion of the connector via at least one hinge.

6. The apparatus of claim 1, wherein the connector includes at least one lock for maintaining the first portion of the connector and the second portion of the connector in the second orientation.

7. The apparatus of claim 6, wherein the at least one lock maintains the first portion and the second portion of the connector in the second orientation utilizing friction.

8. The apparatus of claim 1, wherein, in the second orientation and when the first card is removably received in the first portion of the connector, the connector is configured such that the first card is locked in the first portion of the connector.

9. The apparatus of claim 8, wherein, in the second orientation and when the first card is removably received in the first portion of the connector, the connector is configured such that the first card is locked in the first portion of the connector, regardless as to whether the second card is removably received in the second portion of the connector.

10. The apparatus of claim 1, wherein, in the second orientation and when the first card is removably received in the first portion of the connector, the connector is configured such that electrical communication is permitted between the device and the first card, regardless as to whether the second card is removably received in the second portion of the connector.

11. The apparatus of claim 1, wherein the first portion of the connector is shaped to preclude removably receiving the first card in an improper orientation.

12. The apparatus of claim 1, wherein the second portion of the connector is shaped to preclude removably receiving the second card in an improper orientation.

13. The apparatus of claim 1, wherein the connector includes an aperture formed therein for receiving a pin to remove the connector from the device.

14. The apparatus of claim 1, wherein the first portion is configured for removably receiving the first card in a form of a subscriber identity module, and the second portion is configured for removably receiving the second card in a form of a memory card.

15. The apparatus of claim 1, wherein the first portion of the connector is hingably coupled to the second portion of the connector such that the first portion of the connector and the second portion of the connector are movable between the first orientation and the second orientation, such that:
  in the first orientation, the first portion of the connector is positioned for removably receiving the first card; and
  in the second orientation, the second portion of the connector is positioned for: engaging the first portion of the connector, while removably receiving the second card, wherein the second card extends beyond the first card to further permit electrical communication between the device and the second card when the second card is removably received in the second portion of the connector.

16. A method, comprising:
  providing a connector including a first portion and a second portion, the connector configured to receive both a first card of a first size and a second card of a second size, wherein the first portion is moveable with respect to the second portion to as to configure the connection in a first orientation or a second orientation, such that:
    when the connection is configured in the first orientation, the first portion of the connector is positioned for removably receiving the first card of the first size, or the second portion of the connector is positioned for removably receiving the second card of the second size; and
    when the connection is configured in the second orientation, the first card is stacked with the second card for being removably inserted in a device to permit electrical communication between the device and the first card when the first card is removably received in the first portion of the connector, and further to permit electrical communication between the device and the second card when the second card is removably received in the second portion of the connector; and wherein the connector is configured for being removed from the device without powering down the device.

17. The method of claim 16, wherein, in the first orientation, the first portion of the connector is positioned for removably receiving the first card.

18. The method of claim 17, wherein, in the second orientation, the second portion of the connector is positioned for removably receiving the second card.

19. The method of claim 16, wherein the first portion of the connector is hingably coupled to the second portion of the connector such that the first portion of the connector and the second portion of the connector are movable between the first orientation and the second orientation, such that:
  in the first orientation, the first portion of the connector is positioned for removably receiving the first card; and
  in the second orientation, the second portion of the connector is positioned for: engaging the first portion of the connector, while removably receiving the second card, wherein the second card extends beyond the first card to further permit electrical communication between the device and the second card when the second card is removably received in the second portion of the connector.

20. A method, comprising:
placing a first card into a first portion of a connector, wherein the first card has a first size;
placing a second card into a second portion of the connector, wherein the second card has a second size, the second size is different than the first size, the portion is moveable with respect to the second portion to as to configure the connection in a first orientation or a second orientation, the connector being configurable such that:
  in the first orientation, the first portion of the connector is positioned for removably receiving the first card of the first size, or the second portion of the connector is positioned for removably receiving the second card of the second size; and
  in the second orientation, the first card is stacked with the second card for being removably inserted in a device to permit electrical communication between the device and the first card when the first card is removably received in the first portion of the connector, and further to permit electrical communication between the device and the second card when the second card is removably received in the second portion of the connector;
inserting the connector in the device; and
removing the connector from the device without powering down the device.

* * * * *